Figure 1:
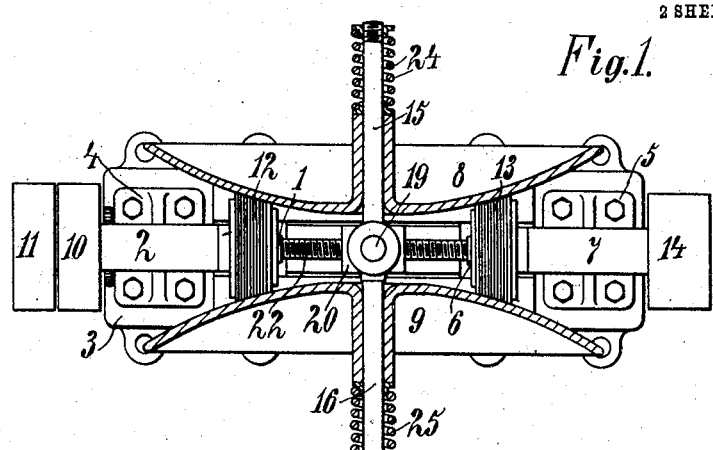

No. 790,362. PATENTED MAY 23, 1905.
M. GÜTTNER.
VARIABLE SPEED POWER TRANSMISSION MECHANISM.
APPLICATION FILED JULY 8, 1904.

2 SHEETS—SHEET 1.

Witnesses.

Inventor
Max Güttner

No. 790,362. PATENTED MAY 23, 1905.
M. GÜTTNER.
VARIABLE SPEED POWER TRANSMISSION MECHANISM.
APPLICATION FILED JULY 8, 1904.

2 SHEETS—SHEET 2.

Witnesses.

Inventor
Max Güttner
by B. Singer atty.

No. 790,362.  
Patented May 23, 1905.

UNITED STATES PATENT OFFICE.

MAX GÜTTNER, OF CHEMNITZ, GERMANY.

VARIABLE-SPEED POWER-TRANSMISSION MECHANISM.

SPECIFICATION forming part of Letters Patent No. 790,362, dated May 23, 1905.

Application filed July 8, 1904. Serial No. 215,801.

*To all whom it may concern:*

Be it known that I, MAX GÜTTNER, a subject of the German Emperor, residing at Chemnitz, in the Kingdom of Saxony and Empire of Germany, have invented certain new and useful Improvements in Variable-Speed Power-Transmission Mechanism, of which the following is a specification.

My invention relates to improvements in variable-speed-transmission mechanism wherein rotary motion from a prime mover is transmitted to a load at an equal or variable speed and wherein the transmission of power is effected by frictional engagement of the coöperating parts. In devices of this nature there is usually employed driving and driven wheels interposed between and engaged by transmission-disks, the latter being mounted in fixed bearings and having relatively extensive surface areas. To secure difference in speed between the driven and driving wheels, one of the same is moved toward the axis of rotation of said transmission-disks while the other is moved toward the periphery of said disks. Where said transmission-disks are of extended radii and the driving and driven wheels occupy positions just indicated, the lateral thrust or strain upon the disks on one side of the center thereof exceeds that which is received on the opposite side of said center. This defective result is caused by the great leverage secured by the wheel near the periphery of the disks over that secured by the wheel near the axis of rotation of said disks, and the resulting wrenching and torsional strains are thrown upon the disk-bearings. This defective construction not only requires extra reinforcements for the bearings, but distributes the frictional wear of the disk-journals unequally in the bearings in the same, thereby increasing wear and friction of said parts and generally reducing the efficiency of the device. This defect is present in the devices of the prior art, however adjusted, except where the driving and driven wheels occupy positions of equal distance from the axis of the transmission-disks, which adjustment equalizes the speed of said driving and driven wheels. Since the purpose of variable-speed devices is to transmit rotary motion at different rates of speed, this adjustment of the parts is not a prevalent one. Therefore it will be seen that to a greater or less extent the defect referred to is always present in devices of the prior art.

In my improved device the strain thrust upon the bearings of the transmission members is constant and does not vary with the shifting of parts in effecting change of speed. The unequal strains caused by shifting of parts is in my improved construction sustained by the transmission members, and to effect this result the same are movably and desirably pivotally mounted. Thus variable speed of the driven member with respect to the driving member is secured by bodily moving the transmission members in opposite directions instead of causing the driving and driven members to move back and forth abreast of the transmission members, as in devices of the prior art. In a construction of this nature the transmission-disks may be made of any desired diameter without fear of disrupting the bearing thereof. It will be readily seen that an integral member of a device having no separately-moving parts, such as a transmission-disk, may easily be relied upon to sustain heavy wrenching strains, which if thrown upon a bearing would result in an inefficient and unmechanical operation.

A further advantage secured by my improved construction consists in the avoidance of counter friction or drag between the transmission members and friction-wheels, whereby broad surface contact may be secured without impairing the efficiency of the device. Heretofore in power-transmission devices of this character the friction-wheels interposed between the transmission members or disks have either been made with restricted peripheral surfaces or differential gears and like means have been provided to effect a variable speed travel of the peripheries of said wheels, it being well understood that the surface speed travel of cylindric wheel is uniform, while the travel of the surface of a disk engaged by said wheel is variable. I avoid the inefficiency of wheels of restricted area and the cost of wheels having auxiliary mechanism by constructing the transmission members and wheels so that each of their engaging surfaces travel at proportionately variable speeds. This result is preferably attained by constructing the friction-wheels of a generally conical or tapering formation and by forming the transmission members of a generally spherical contour. It is well known that the speed travel of the periphery of the large end of a tapered wheel exceeds the speed attained by the periphery near the small end thereof. Likewise the speed travel of a disk near the periphery thereof exceeds the speed attained near the axis. In my improved device the peripheral travel of the friction-wheel may be at a much less rate of speed than the rate attained by the transmission member; but owing to the peculiar formation of said parts all drag and counter-friction between the engaging member will be avoided.

My invention has other advantages which will be more fully described by reference to the accompanying drawings and will be more particularly pointed out in the appended claims.

Figure 2:
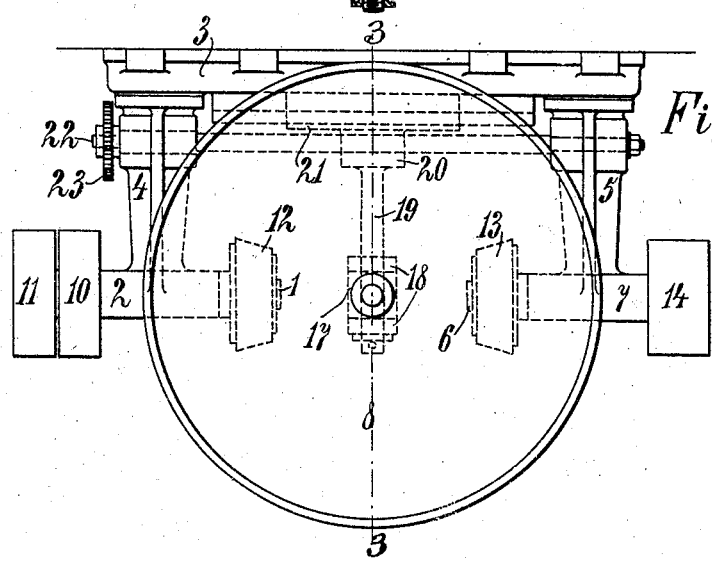
Figure 3:
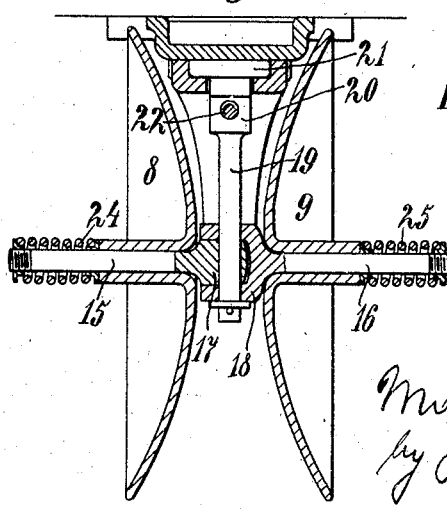
Figure 4:
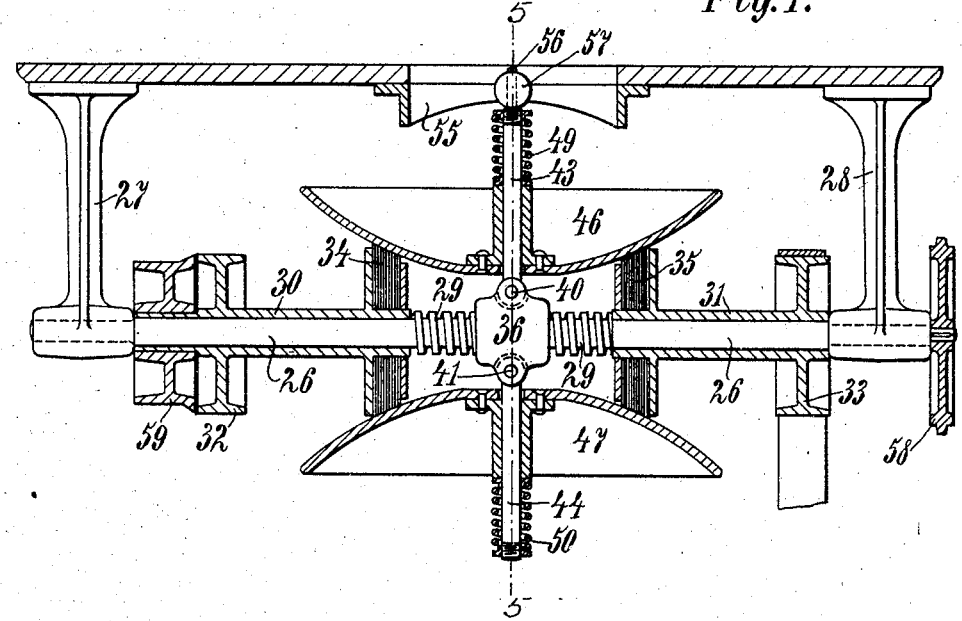
Figure 5:
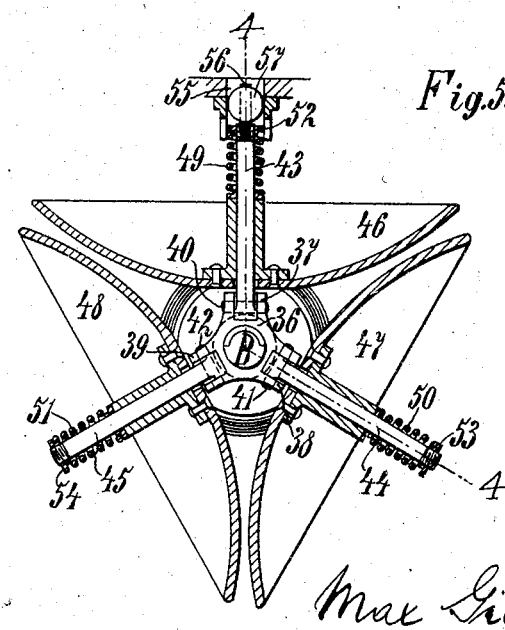

In the drawings, Figure 1 represents an axial sectional view of a transmission device embodying the main features of my invention and taken on line 1 1 of Fig. 2, showing the driving and driven wheels and mechanism thereof in elevation. Fig. 2 is a view in elevation of the device shown in Fig. 1. Fig. 3 is a vertical sectional view on line 3 3 of Fig. 2. Fig. 4 is a vertical sectional view of a modified form of the device shown in Fig. 1, taken on line 4 4 of Fig. 5. Fig. 5 is a vertical sectional view taken on line 5 5 of Fig. 4.

Like parts are indicated by similar characters of reference throughout the different figures of the drawings.

In the embodiment of the device herein shown the same is suspended from a suitable ceiling-support by a frame 3, provided with depending hangers 4 and 5, rigidly mounted thereto. Said hangers 4 and 5 terminate at their lower ends in bearings 2 and 7, in which horizontally-rotatable shafts 1 and 6 are journaled. One of said shafts is preferably a driving-shaft, while the other is a driven shaft. There is desirably mounted on the outer end of shaft 1, which is the driving-shaft, fast and loose pulleys 10 and 11, and upon the inner end of said shaft a friction-wheel 12. The driven shaft 6 is provided on its outer end with a belt-pulley 14 and upon its inner end with a friction-wheel 13. Power is transmitted from the driving friction-wheel 12 to the driven friction-wheel 13 through the medium of transmission members 8 and 9, which preferably coöperate with said wheels 12 and 13. I preferably secure variable speed of said shafts 1 and 6 by causing bodily movement of the said members 8 and 9 with respect to the friction-wheels 12 and 13. Said hangers 4 and 5 are provided with bearings for rod 22, which, as shown, is prevented from longitudinal movement by means of a nut screwed on one end portion, and a pinion 23 secured on the opposite end. The central portion of said rod 22 is provided with exterior screw-threads adapted to engage the hub 20 of a cross-head 21, which has slidable engagement in ways formed on the frame 3. Said cross-head 21 is provided with a depending shank 19, upon which are pivotally mounted supports for the transmission members 8 and 9. Said supports preferably consist of a pivotal joint having lateral cylindric extensions 15 and 16, which constitute journals for the transmission members 8 and 9. Journal 15 is provided on its inner end with an enlarged hub 17, having a bore through which the shank 19 passes. The extension 16 is provided with the bifurcated portion 18, which straddles the hub 17 and is provided with the apertures through which the shank 19 passes. The said parts 17 and 18 are preferably supported in position upon the shank 19 by means of a washer surrounding said shank and resting upon a pin passing transversely therethrough, as will be clearly seen by reference to Figs. 2 and 3. The transmission members 8 and 9 are provided with hubs rotatably mounted on the extensions 15 and 16. In order to maintain contact between said members 8 and 9 and the friction-wheels 12 and 13, expansively-acting springs 24 and 25 are interposed between nuts having screw-threaded connections with the outer ends of journals 15 and 16, and washers bearing against the hubs of said transmission members. The said springs 24 and 25 permit a laterally-expanding movement of the transmission members 8 and 9 when the same are moved bodily upon the friction-wheels 12 and 13 to effect variable speed of the same. This operation is preferably effected by rotating the shaft 22 by means of the pinion 23, which serves to slide the cross-head 21 and carry the members 8 and 9 bodily toward or away from either one of the friction-wheels 12 or 13, as the case may be. It will be obvious by reference to Fig. 1 that if the rod 22 is rotated in a direction to move the transmission members 8 and 9 toward driving friction-wheel 12 the said transmission members will be swung about their pivot (the shank 19) in a horizontal plane and in a direction reverse to that indicated by the arrow in Fig. 1. When this adjustment of parts is effected, the friction-wheel 12 will engage the members 8 and 9 at a position nearer their axes of rotation than that occupied by the wheel 13, thereby causing rotation of the wheel 13 at a speed greater than the speed at which the driving-wheel 12 is driven. It will also be understood that a reverse movement of the shank 19 to the direction indicated by the arrow in Fig. 1 will cause the transmission members to engage the respective peripheries of the friction-wheels 12 and 13 in a manner to cause the latter to rotate at a slower rate of speed than the former.

It will be readily seen that movement of members 8 and 9 in the manner described will cause the same to be displaced from the shank 9 in proportion as said shank is moved in either direction, which displacement is permitted by the springs 24 and 25, as hereinbefore described. The employment of the transmission members 8 and 9 in the manner described in not an essential feature of the invention, since a relative movement of the friction-wheels 12 and 13 with respect to said transmission members would in some instances serve equally as well as the described means.

In Figs. 4 and 5 are shown modifications of the construction above described wherein three transmission members 46 47 48 are employed, the same coöperating with friction-wheels 34 and 35, which are rotatably mounted on shaft 26. The said device is preferably suspended from a suitable ceiling-support by hangers 27 and 28, which terminate in bearings adapted to carry the journals of shaft 26. A pinion 58 is keyed on the outer end of shaft 26 and serves when operated to rotate said shaft. Screw-threads 29 are desirably formed upon said shaft 26 at a point between the friction-wheels 34 and 35, said screw-threads engaging a threaded sleeve 36. Rods 43 44 45 are pivotally secured to the sleeve 36 between ears 37 38 39. Said ears and rods are provided with registering apertures through which pins 40 41 42 are inserted to effect pivoted engagement of said rods with said sleeves. Said rods 43 44 45 pass through removably-mounted hubs on the transmission members and carry on their ends nuts 52 53 54 and springs 49 50 51, which latter bear at their opposite ends upon washers engaging the hubs of the transmission members and against the said nuts. In order to prevent rotation of the transmission members, one of the rods preferably engages an open guideway 55 of sufficient length to permit the outer end of rod 43 to swing during adjustment of the transmission members. Said rod 43 is provided on its outer end with a reduced shank 56, which carries an antifriction-ball 57, the latter serving to reduce the frictional contact of the parts above described. In the modified form herein shown the driving and driven wheels 34 and 35 are preferably secured to sleeves 30 and 31, which rotate freely upon the shaft 26. Said sleeve 30 is provided with an integrally-formed pulley 32 and a loose pulley 59 adjacent thereto. The sleeve 31 is provided with a pulley 33, whereby rotary motion may be transmitted from the driven pulley 35 to parts with which the device coöperates. It will be obvious that the devices herein shown may be serviceable where two transmitting members are employed instead of three. I preferably employ a laminated construction for the friction-wheels 34 and 35, which structure is compressed between fast and loose flanges mounted upon the sleeves 30 and 31, as clearly shown in Fig. 4. This construction presents a much more effective engaging service to the transmission members and has an added advantage that it may be made of leather or like material easily renewed. In the construction shown in Figs. 1 to 5 the transmission members are shown spherical and the friction-wheels have peripheral surfaces of complemental formation. By means of this construction the speed of surface travel of said friction-wheels varies in the same ratio as does the speed of the surface area of the transmission members which they engage, although the rate of speed of the engaging surfaces may vary greatly, according as the friction-wheels are positioned near to or remote from the axis of said transmission members.

While I have herein shown and described a specific embodiment of my invention, I do not wish to be limited thereto, as changes may readily be made from the precise construction shown without departing from the spirit of the invention.

Therefore what I claim, and desire to secure by Letters Patent, is—

1. In a power-transmission device, the combination with a supporting-frame, of a depending shank slidably mounted in said frame and having a threaded aperture, a threaded operating-shaft adapted to pass through said shank to reciprocate the said slide, a sprocket-wheel mounted on said shaft whereby the same may be rotated, transmission-disks pivotally mounted on said shank, springs for said disks serving to hold the same normally adjacent to said pivotal mounting, and a driving and a driven wheel interposed between said disks, said friction-wheel being rotatably mounted in fixed bearings.

2. In a power-transmission device, the combination with a supporting-frame, of a depending shank slidably mounted therein, means affecting reciprocation of said shank, transmission-disks supported by said shank, a driving and a driven friction-wheel interposed between said transmission-disks, the axes of rotation of said driving and driven wheels intersecting the axes of rotation of said transmission-disks.

3. In a power-transmission device, the combination with a supporting-frame, of a depending shank slidably mounted therein, means effecting reciprocation of said shank, journals pivotally mounted on said shank, transmission-disks rotatably mounted on said journals, driving and driven friction-wheels interposed between said disks, and expansively-acting springs engaging said disks and holding the same in contact with said friction-wheels.

4. In a power-transmission device, the combination with a supporting-frame, of a depending shank slidably mounted therein, means effecting reciprocation of said shank, transmission-disks pivotally mounted on said shank, and driving and driven wheels interposed between said disks.

5. In a power-transmission device, the combination with a supporting-frame, of a depending shank slidably mounted therein, means effecting reciprocation of said shank, transmission-disks movably supported on said shank, and driving and driven wheels interposed between said disks.

6. In a power-transmission device, the combination with a movably-mounted member, a support for said movably-mounted member serving to actuate the same, transmission-disks pivotally mounted on said member, and driving and driven wheels interposed between said disks.

In testimony whereof I affix my signature in presence of two witnesses.

MAX GÜTTNER.

Witnesses:
  MORRIS LIPMAN,
  M. BÖHME.